United States Patent
Sabev

(10) Patent No.: US 7,512,953 B1
(45) Date of Patent: Mar. 31, 2009

(54) SYSTEM AND METHOD FOR SMART PROXY CREATION AND MANAGEMENT WITHIN A DISTRIBUTED OBJECT-ORIENTED ARCHITECTURE

(75) Inventor: Hristo K. Sabev, Sofia (BG)

(73) Assignee: Sap AG, Walldorf (DE)

( * ) Notice: Subject to any disclaimer, the term of this patent is extended or adjusted under 35 U.S.C. 154(b) by 641 days.

(21) Appl. No.: 10/931,415

(22) Filed: Aug. 31, 2004

(51) Int. Cl.
*G06F 9/44* (2006.01)
(52) U.S. Cl. .................. 719/316; 719/328; 719/330
(58) Field of Classification Search ................ 719/310, 719/315, 316, 328, 330, 311; 709/201, 202, 709/217, 219, 220; 707/1, 100, 104.1
See application file for complete search history.

(56) References Cited

U.S. PATENT DOCUMENTS

| | | | |
|---|---|---|---|
| 6,601,233 B1 * | 7/2003 | Underwood | 717/102 |
| 6,668,327 B1 * | 12/2003 | Prabandham et al. | 726/4 |
| 6,836,889 B1 * | 12/2004 | Chan et al. | 719/310 |
| 6,868,441 B2 * | 3/2005 | Greene et al. | 709/220 |
| 6,868,543 B1 * | 3/2005 | Nusbickel | 719/318 |
| 6,922,685 B2 * | 7/2005 | Greene et al. | 707/1 |
| 6,941,562 B2 * | 9/2005 | Gao et al. | 719/330 |
| 6,947,943 B2 * | 9/2005 | DeAnna et al. | 707/100 |
| 6,959,307 B2 * | 10/2005 | Apte | 707/104.1 |
| 7,069,249 B2 * | 6/2006 | Stolfo et al. | 705/74 |
| 7,159,224 B2 * | 1/2007 | Sharma et al. | 719/310 |
| 7,246,358 B2 * | 7/2007 | Chinnici et al. | 719/315 |
| 2002/0174191 A1 * | 11/2002 | Robertson et al. | 709/217 |
| 2003/0191803 A1 * | 10/2003 | Chinnici et al. | 709/203 |
| 2004/0015564 A1 * | 1/2004 | Williams | 709/219 |
| 2004/0143625 A1 * | 7/2004 | Sheinis et al. | 709/202 |
| 2004/0205771 A1 * | 10/2004 | Sudarshan et al. | 719/316 |

* cited by examiner

*Primary Examiner*—Van H Nguyen
(74) *Attorney, Agent, or Firm*—Blakely, Sokoloff Taylor & Zafman

(57) ABSTRACT

A system and method are described for implementing a smart proxy within an object-oriented environment. One embodiment of the invention reduces the number of remote network calls required for creating and removing enterprise java beans ("EJBs"), thereby improving the efficiency of the entire system. Specifically, a smart proxy is generated on a remote java virtual machine ("JVM"), in front of the home object and remote object, and is configured to handle certain types of remote method invocations at the client side. In this embodiment, the client is no longer configured to hold a direct reference to the home or remote objects, or stubs, as in prior systems. Rather, the client holds a reference to the smart proxy, which communicates with the home and remote objects on behalf of the client. In response to a method call on the EJB Object reference, for example, the proxy will analyze the call, possibly change state, and make a decision as to whether the call must be forwarded to the home or remote objects, or whether it can be handled locally by the proxy itself.

20 Claims, 14 Drawing Sheets

SYSTEM AND METHOD FOR SMART PROXY CREATION AND MANAGEMENT WITHIN A DISTRIBUTED OBJECT-ORIENTED ARCHITECTURE

BACKGROUND

1. Field of the Invention

This invention relates generally to the field of data processing systems. More particularly, the invention relates to a system and method for implementing a client-side proxy an object-oriented environment.

2. Description of the Related Art

Multi-Tier Enterprise Computing Systems

Java 2 Enterprise Edition ("J2EE") is a specification for building and deploying distributed enterprise applications. Unlike traditional client-server systems, J2EE is based on a multi-tiered component architecture in which server side program code is divided into several layers including a "presentation" layer and a "business logic" layer.

FIG. 1 illustrates an exemplary J2EE application server 100 in which the presentation layer is implemented as a Web container 111 and the business layer is implemented as an Enterprise JavaBeans ("EJB") container 101. Containers are runtime environments which provide standard common services 119, 109 to runtime components. For example, the Java Naming and Directory Interface ("JNDI") is a service that provides application components with methods for performing standard naming and directory services. Containers also provide unified access to enterprise information systems 117 such as relational databases through the Java Database Connectivity ("JDBC") service, and legacy computer systems through the J2EE Connector Architecture ("JCA") service. In addition, containers provide a declarative mechanism for configuring application components at deployment time through the use of deployment descriptors.

As illustrated in FIG. 1, each layer of the J2EE architecture includes multiple containers. The Web container 111, for example, is itself comprised of a servlet container 115 for processing servlets and a Java Server Pages ("JSP") container 116 for processing Java server pages. The EJB container 101 includes three different containers for supporting three different types of enterprise Java beans: a session bean container 105 for session beans, an entity bean container 106 for entity beans, and a message driven bean container 107 for message driven beans. A more detailed description of J2EE containers and J2EE services can be found in RAGAE GHALY AND KRISHNA KOTHAPALLI, SAMS TEACH YOURSELF EJB IN 21 DAYS (2003) (see, e.g., pages 353-376).

Enterprise Java Beans ("EJBs")

As illustrated generally in FIG. 2, session beans 255-257 comprise the high level workflow and business rules implemented by the application server 100. For example, in a customer relationship management ("CRM") system, session beans define the business operations to be performed on the underlying customer data (e.g., calculate average customer invoice dollars, plot the number of customers over a given timeframe, . . . etc).

Session beans typically execute a single task on behalf of a client during a "session." Two versions of session beans exist: "stateless" session beans and "stateful" session beans. As its name suggests, a stateless session bean interacts with a client without storing a current state of its interaction with the client. By contrast, a stateful session bean stores its state across multiple client interactions.

Entity beans are persistent objects which represent data (e.g., customers, products, orders, . . . etc) stored within a database 223. Typically, an entity bean 252 is mapped to a table 260 in the relational database and, as indicated in FIG. 2, each "instance" of the entity bean is typically mapped to a row in the table (referred to generally as an "object-relational mapping"). Two different types of persistence may be defined for entity beans: "bean-managed persistence" and "container-managed persistence." With bean-managed persistence, the entity bean designer must provide the code to access the underlying database (e.g., SQL Java and/or JDBC commands). By contrast, with container-managed persistence, the EJB container 101 manages the underlying calls to the database.

Each EJB consists of a "home" interface, a "component" interface, and one class, the "bean" class. As described in greater detail below, the home and component interfaces may be configured as either "local" or "remote" interfaces. The home interface lists the methods available for creating, removing and finding EJBs within the EJB container. The home object is the implementation of the home interface and is generated by the EJB container at deploy time. The home object is used by clients to identify particular components and establish a connection to the components' interfaces. The component interface, also referred to herein as the "remote interface," provides the underlying business methods offered by the EJB.

FIG. 3 provides a graphical representation of the home and remote interfaces. An EJB client 301 initially looks up the EJB home object 302 of the enterprise bean using JNDI services. The client then uses the home object to create an EJB instance 305. The client is not provided with a direct reference to the newly-created EJB instance. Rather, the client receives a reference to an EJB object 303—an object of the remote interface. The client calls the EJB object, and the EJB container 101 delegates calls to the enterprise bean instance.

Because the method calls from a client to an EJB are indirect, the EJB container can control how and when calls to the EJB class occur. This indirection allows the EJB container to provide functionality such as life cycle management, security, and transactions between EJB class method calls.

Remote Method Invocation ("RMI")

In the J2EE distributed object model, a "remote object" is one whose methods can be invoked from another Java Virtual Machine ("JVM"), potentially on a different host. An object of this type is described by one or more remote interfaces, which declare the methods of the remote object.

A remote client accesses a session bean or an entity bean through the bean's remote home interface and remote interface. The home and remote interfaces of the bean provide the remote client view of the EJB. In a J2EE environment, the remote interface extends the java.ejb.EJBobject interface and the remote home interface extends the java.ejb.EJBHome interface. Container tools generate the corresponding EJB object and EJB home object, respectively, implementing these interface.

The invocation of a method of a remote interface on a remote object is referred to as remote method invocation ("RMI"). RMI uses a standard mechanism for communicating with remote objects that may employ stubs and skeletons. A stub for a remote object acts as a client's local representative for the remote object. The caller invokes a method on the local stub, which is responsible for carrying out the method call on the remote object. In RMI, a stub for a remote object implements the same set of remote interfaces that the remote object implements.

When a stub's method is invoked, it (1) initiates a connection with the remote JVM containing the remote object; (2) marshals (writes and transmits) the parameters to the remote JVM; (3) waits for the result of the method invocation; (4) unmarshals (reads) the return value or exception returned; and (5) returns the value to the caller. The stub hides the serialization of parameters and the network-level communication in order to present a simple invocation mechanism to the caller/client.

In a remote virtual machine, each remote object may have a corresponding skeleton which is responsible for dispatching the call to the actual remote object implementation. When a skeleton receives an incoming method invocation, it (1) unmarshals (reads) the parameters for the remote method; (2) invokes the method on the actual remote object implementation; and (3) marshals (writes and transmits) the result (return value or exception) to the caller.

Location transparency is one of the primary benefits of RMI. Clients do not need to be made aware of the location of the remote object. From the client's perspective, it does not matter if the remote object is in the same JVM as the client, in a different JVM but on the same machine as the client, or on a different machine from the client.

For performance reasons, often, a single remote object is used to handle calls to remote interface methods for all instances of stateless session enterprise beans. In such scenarios, different clients use one and the same EJBObject implementation, which in fact is this single RMI object. The EJB specification however requires that two references to EJBObject implementations, achieved by two separate calls to the create( ) method of a stateless bean's home interface, be able to be in different states at the same time. For example, if two clients have obtained references to an EBJObject implementation by calling create( ), the invocation of the EJBOjbect.remove( ) on the first reference must not also invalidate the second reference.

The most common way of using a stateless bean is to create a bean by calling the create( ) method of the remote interface, then to call a business method of the bean, and finally to remove the bean. In certain situations, it would be desirable to avoid the network calls for creating and removing bean, thus greatly improving the performance of the whole system.

SUMMARY

A system and method are described for implementing a smart proxy within an object-oriented environment. One embodiment of the invention reduces the number of remote network calls required for creating and removing enterprise java beans ("EJBs"), thereby improving the efficiency of the entire system. Specifically, a smart proxy is generated on a remote java virtual machine ("JVM"), in front of the home object and remote object, and is configured to handle certain types of remote method invocations at the client side. In this embodiment, the client is no longer configured to hold a direct reference to the home or remote objects, or stubs, as in prior systems. Rather, the client holds a reference to the smart proxy, which communicates with the home and remote objects on behalf of the client. In response to a method call on the EJB Object reference, for example, the proxy will analyze the call, possibly change state, and make a decision as to whether the call must be forwarded to the home or remote objects, or whether it can be handled locally by the proxy itself.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below is a system and method for managing persistent object-oriented data within an enterprise network. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Note that in this detailed description, references to "one embodiment" or "an embodiment" mean that the feature being referred to is included in at least one embodiment of the invention. Moreover, separate references to "one embodiment" in this description do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Figure 1:
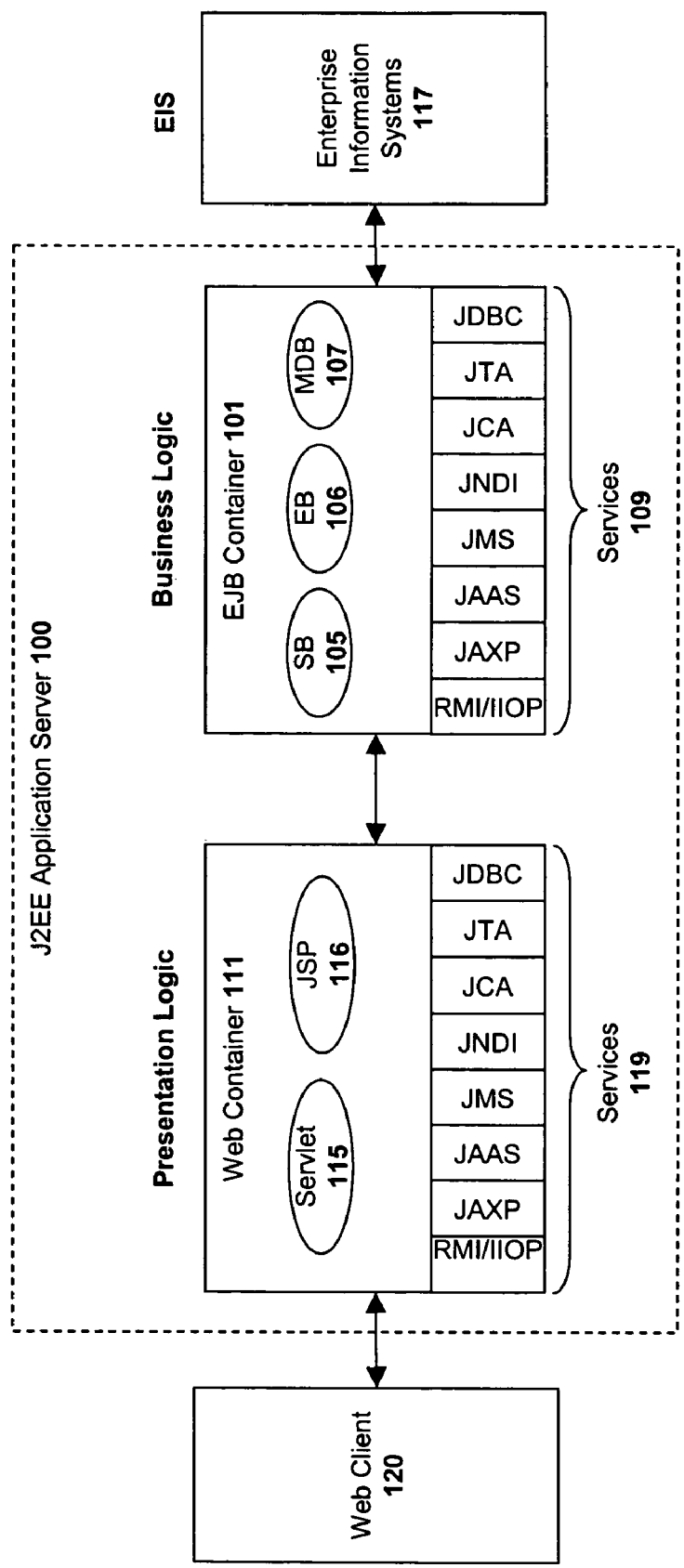
FIG. 1 illustrates several layers within a prior art J2EE architecture.
Figure 2:
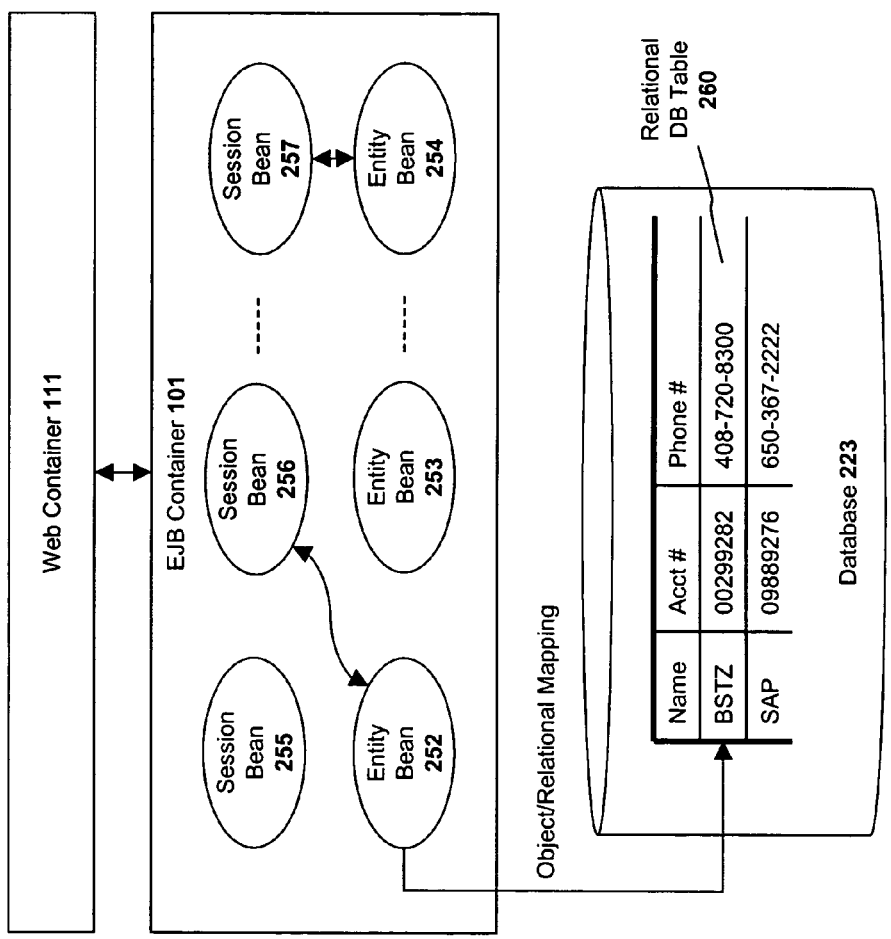
FIG. 2 illustrates a prior art object/relational mapping between an entity bean and a relational database table.
Figure 3:
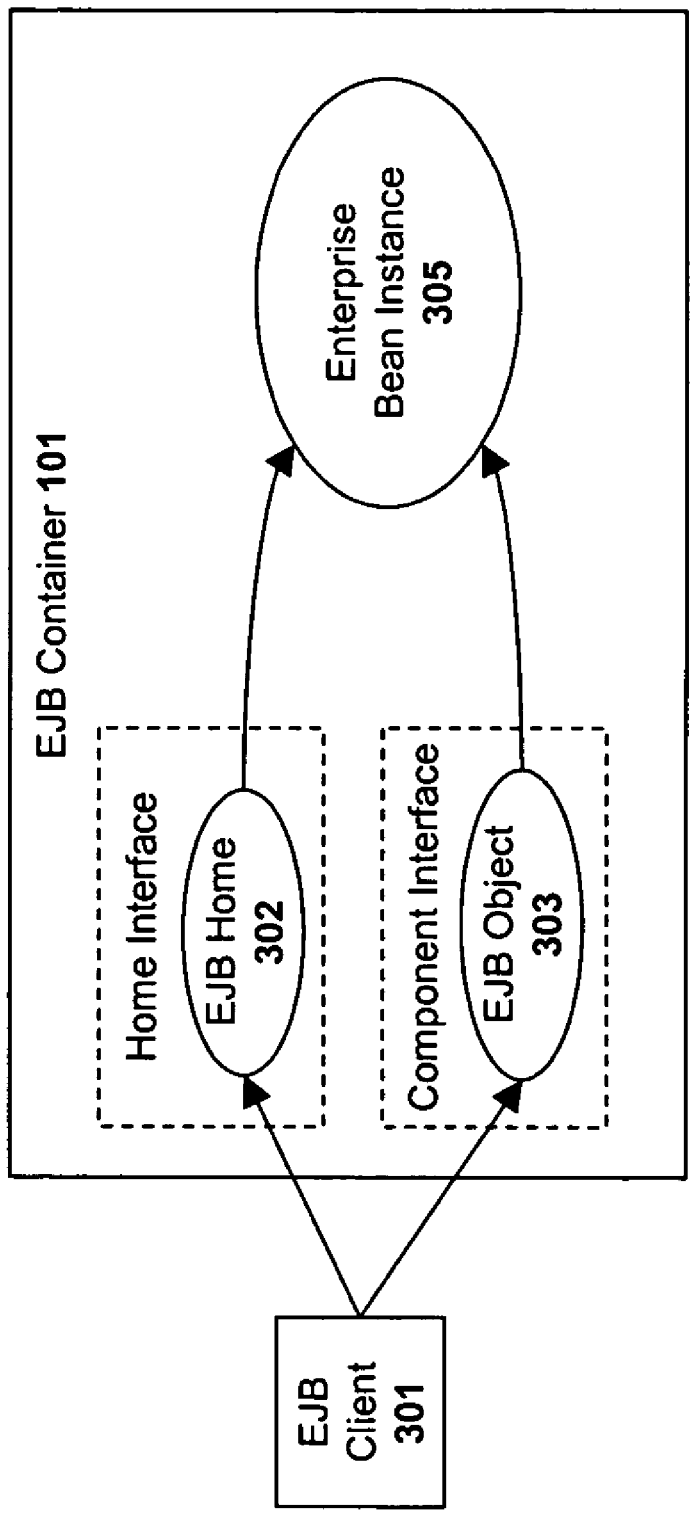
FIG. 3 illustrates a home interface and a component interface employed for a particular EJB.
Figure 4:
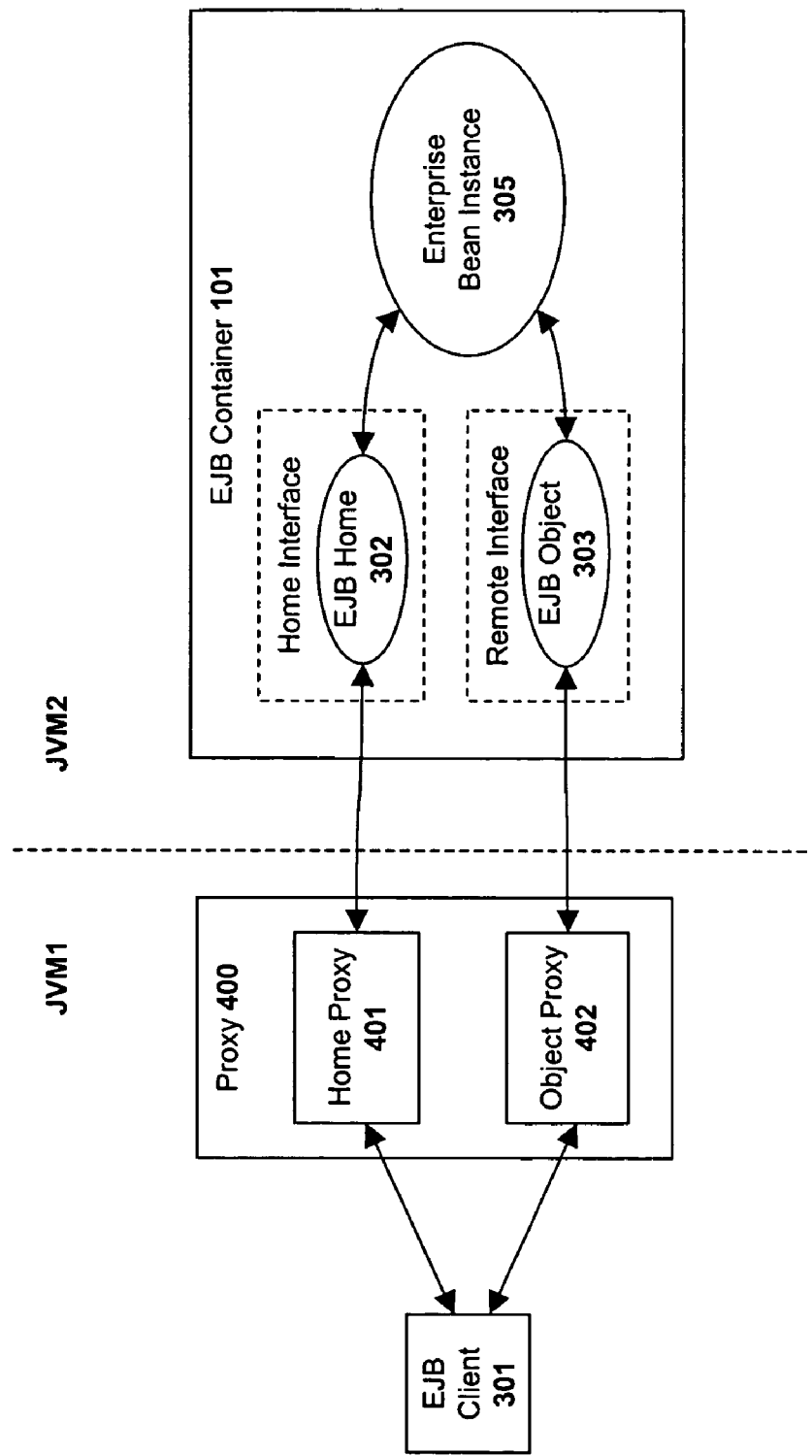
FIG. 4 illustrates a general architectural view of a smart proxy according to one embodiment of the invention.

A System and Method for Smart Proxy Creation and Management within a Distributed Object-Oriented Architecture One embodiment of the invention reduces the number of remote network calls required for creating and removing EJBs, thereby improving the efficiency of the entire system. Specifically, as illustrated in FIG. 4, in one embodiment, a smart proxy 400 is generated at the client side (e.g., on a remote JVM), in front of the home object 302 and remote object 303, and is configured to handle certain types of remote method invocations at the client side. As described in detail below, in one embodiment, the smart proxy 400 is a dynamically-generated instance of a dynamic proxy class.

In this embodiment, the client 301 is no longer configured to hold a direct reference to the home or remote objects, or stubs, as in prior systems. Rather, the client holds a reference to the smart proxy 400, which communicates with the home and remote objects on behalf of the client. In response to a method call on the EJB Object reference, for example, the proxy 400 will analyze the call, possibly change state, and make a decision as to whether the call must be forwarded to the home or remote objects, or whether it can be handled locally by the proxy 400 itself. As indicated in FIG. 4, in one embodiment, the proxy includes "home" proxy logic 401 for communicating with and performing operations associated with the EJB home object 302 and "object" proxy logic 402 for communicating with and performing functions associated with the remote EJB object.

In one embodiment of the invention, initialization of the proxy 400 occurs in the following manner. When the EJB container 101 is initialized it binds its EJB Home implementation 302 into the JNDI service. However, unlike prior J2EE environments, it does not directly bind the server EJB Home object 203 but rather a dynamic serializable proxy 401, which in turn holds a reference to the respective server object 302. Subsequently, when a client 301 looks up the bean from the JNDI registry, it receives a copy of the home proxy 401. Method calls to the bean's home interface methods are then handled by this proxy.

As mentioned above, by analyzing each method call, the proxy is able to significantly reduce network traffic between different JVMs. In many cases, a remote call is not required and the request is handled locally in the client JVM by the proxy 400. By way of example, and not limitation, such situations occur when methods from javax.ejb.EJBHome and javax.ejb.EJBObject interfaces are declared unchecked in the bean's deployment descriptor, indicating that no authorization checks must be performed by the J2EE engine.

Even though stateless beans are technically "stateless" in nature, this is not necessarily true of the EJB Object of a stateless bean. An EJB Object implementation for a bean must be able to keep it's state, in other words an EJB Object of stateless bean must distinguish whether the bean has been removed by a call to EJBObject.remove( ) or not. This is the reason why proxies were necessary, even if they were not able to perform network traffic optimizations. There must be something, between the client and the RMI-stub to the server EJB Object, which keeps the state of the EJB Object. Thus, in one embodiment of the invention, the smart proxy 400 performs these functions in addition to the network traffic optimizations described herein.

For the purpose of illustration, various specific implementations of the invention will now be described. It should be noted, however, that the invention is not limited to these specific implementations. In fact, the underlying principles of the invention may be implemented in a variety of alternate systems and in a variety of alternate contexts.

Many of the figures described below are formatted according to the Unified Modeling Language ("UML"). Accordingly, the remainder of this document assumes that the reader has a basic understanding of UML. A detailed description of UML concepts can be found in *Sams Teach Yourself UML in 24 Hours* (ISBN: 0672322382).

Containers and Components

Figure 5A:
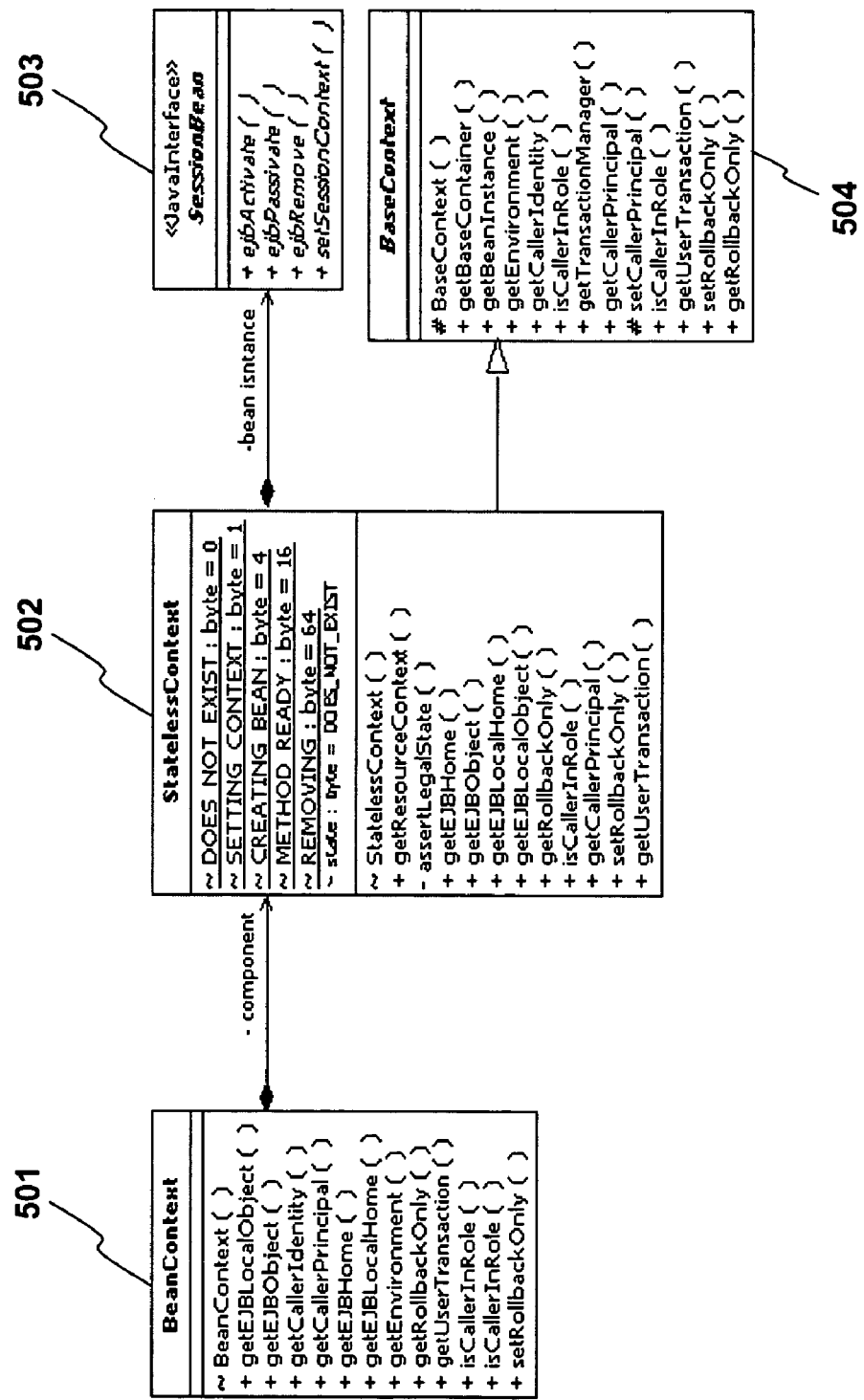
FIGS. 5a-b and 6 illustrate class diagrams employing class relationships employed in one embodiment of the invention.
Figure 5B:
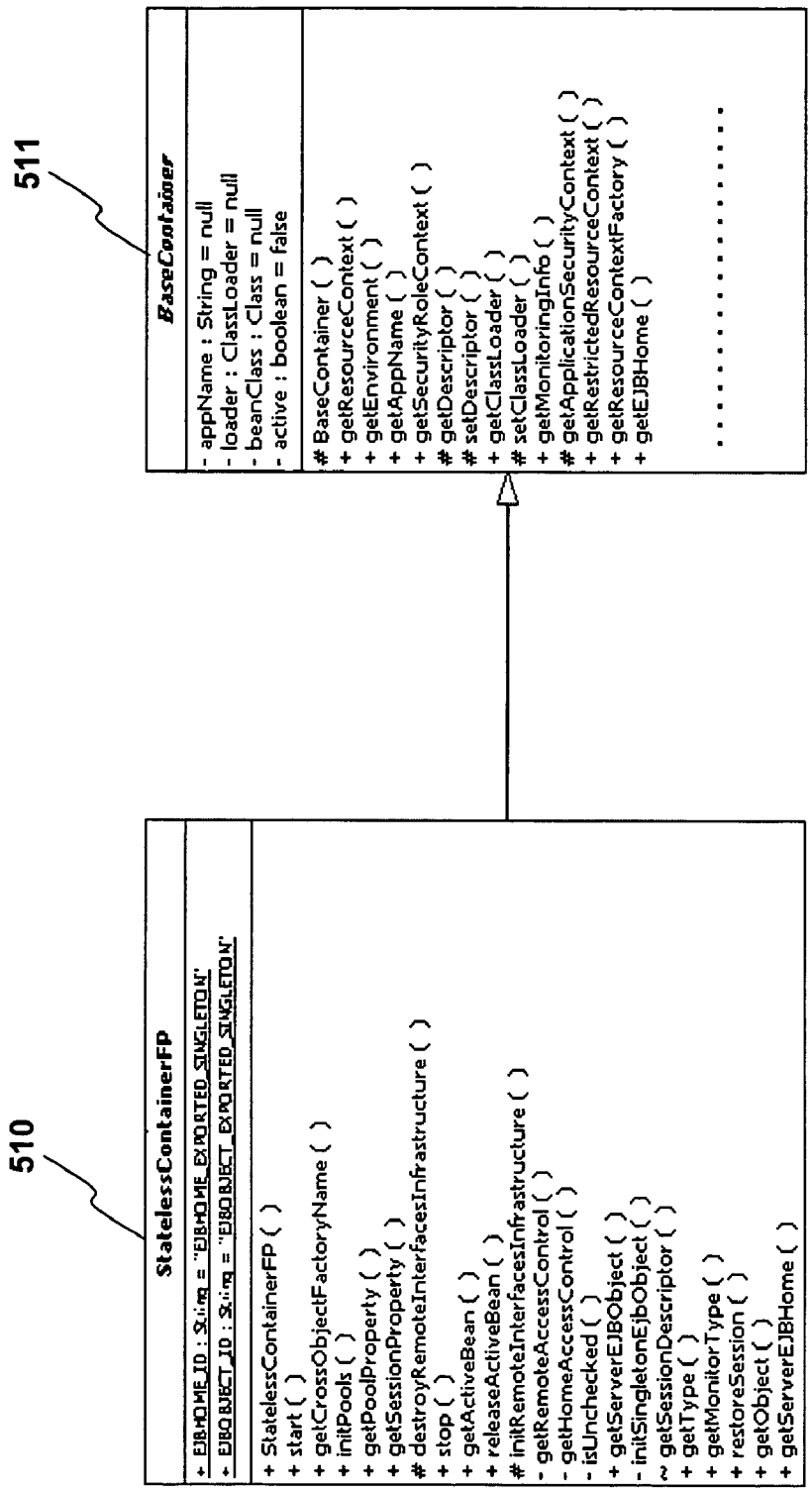

FIGS. 5*a*-*b* illustrates UML class diagrams which describe the static relationship between various J2EE classes employed in one embodiment of the invention. Each deployed stateless session bean is reflected at runtime by an instance of StatelessContainerFP 510. Instances of this class together with objects of class StatelessContext 502 provide the runtime environment of stateless enterprise beans, thus implementing a J2EE container. In this document however the term "container" may be used in a rather restrictive manner. Containers shall be instances of StatelessContainerFP 510, whereas objects of type StatelessContext 502 will be referred to as "beans" or "bean components." This is reasonable as the StatelessContext class 502 aggregates the bean instance 502 and the correspondence is one-to-one, as indicated in FIG. 5*a*.

The class BeanContext 501 is a wrapper around StatelessContext 502. Instances of this class are passed as arguments to SessionBean.setSession Context(SessionContext). This is done in order to prevent access to various internal data structures. As StatelessContext exposes some public methods, mostly inherited from BaseContainer 511 which are intended to be used by other implementation classes located in other Java packages, these methods would be accessible to bean provider by simple type up-cast. Wrapping the bean component in an instance of BeanContext 501, which exposes only the methods from javax.ejb.SessionContext, and setting the wrapper as the context prevents this.

Pool Management

Instances of StatelessContainerFP 510 use objects of type BeanFactory (a well known Java class) to manage their pool. Whenever a bean is fetched out of the pool, returned back to the pool, or if a new bean is created or an existing bean is destroyed, then the BeanFactory class is in charge. It is considered part of the container implementation and, as such, it is visible only in its declaring package. When pool's size must be increased, the pool asks the associated BeanFactory object to create a new bean component. At this point the BeanFactory object creates the both the bean component and the bean instance, and calls the instance's setSessionContext and ejbCreate methods, respectively. When the pool's size must be decreased the BeanFactory object destroys the bean component by calling its ejbRemove method. BeanFactory is also the central point at which the security identity of a bean is handled. If run-as security identity is configured in the bean's deployment descriptor, then when a bean is fetched from the pool in order to serve a business call, or when a bean is created/destroyed, a security session for bean's security identity is created and associated with the executing thread. After the business call has ended, or if the bean is created/destroyed, the security session is ended and bean's code runs on behalf of the calling principal.

Exemplary Smart Proxy Implementations

As described earlier, in one embodiment of the invention, smart proxies are serializable and implement the bean's remote or home interface. In order to satisfy these requirements two separate implementations for EJB Home 401 and EJB Object 402 proxies are employed, as indicated in FIG. 4.

Figure 6:
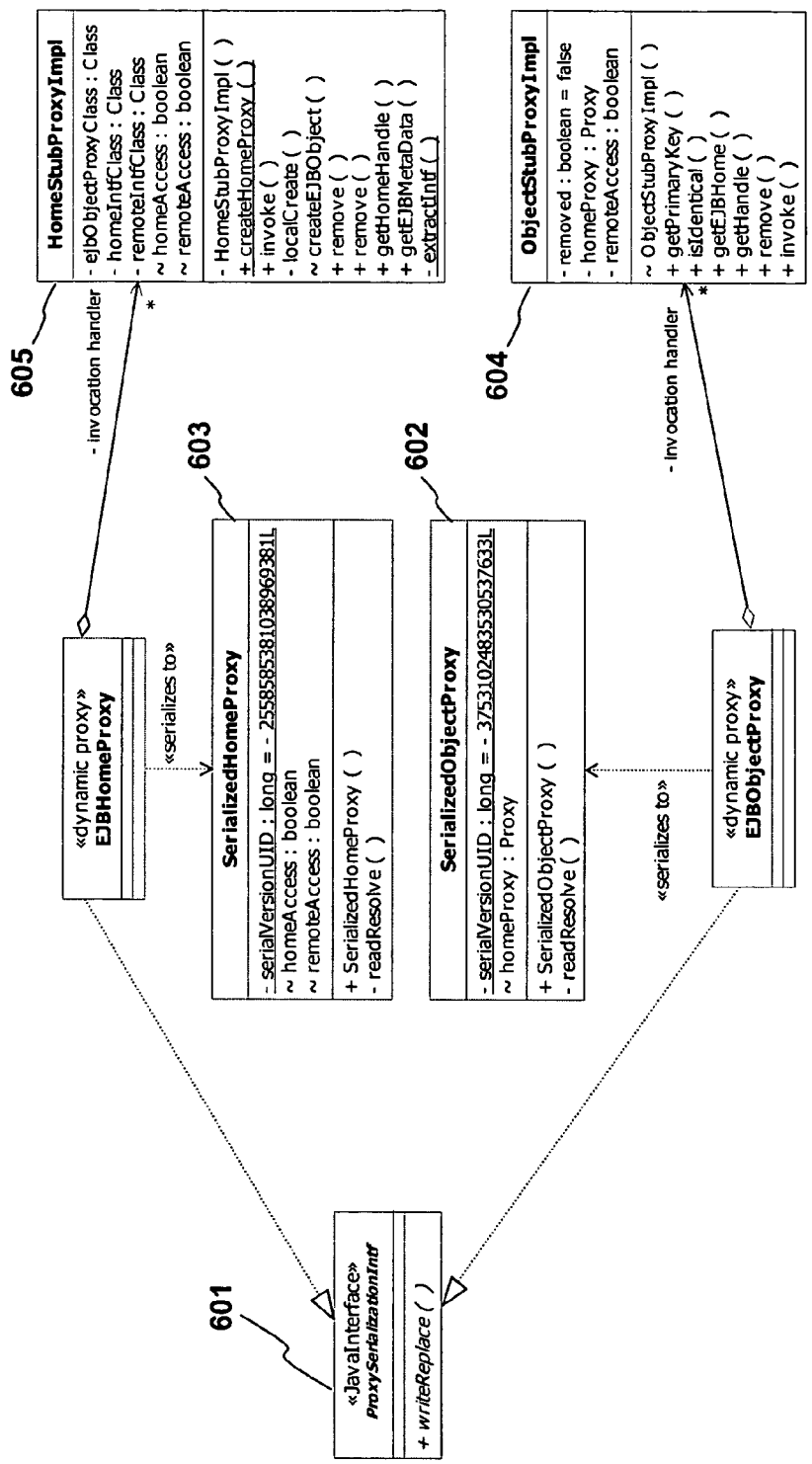

Referring now to FIG. 6, in one embodiment, both implementations force a proxy instance to implement the interface ProxySerializationIntf 601, which is derived from the Java serializable interface, java.io.Serializable, and exposes a single method, writeReplace( ), to enable custom serialization. The writeReplace replace method returns an object of type SerializedObjectProxy 602 or SerializedHomeProxy 603 for EJBObject 402 and EJBHome 401 proxies, respectively. Implementation of the writeReplace( ) method is, of course, provided by the proxy's invocation handler. For EJBObject proxies, the invocation handler is of type ObjectStubProxyImpl 604 and for EJBHome proxies it is of class HomeStubProxyImpl 605. When de-serialized (e.g., at the client JVM), the readResolve( ) method of SerializedHomeProxy 603 and SerializedObjectProxy 602 is executed and the corresponding proxy is reconstructed by the data stored in the serialized object.

When the container starts (i.e., the init( ) method of StatelessContainerFP is invoked) it allocates necessary resources and, in particular, it creates the server EJBObject and server EJBHome and exports them to the underlying RMI communication layer. At this point, in one embodiment, the EJBHome proxy object is created and after the container has finished with its initialization the container startup framework publishes the server EJBHome and EJBHome proxy objects into the JNDI registry so they are available for remote clients.

In one embodiment, clients which use the Common Object Request Broker Architecture ("CORBA") protocol, may use the server EJBHome and EJBObject directly, while clients using an RMI protocol (e.g., P4_RMI) use the EJBHome proxy objects. After the container startup framework has completed its work within the container, the hosted bean is ready for use.

Figure 7:
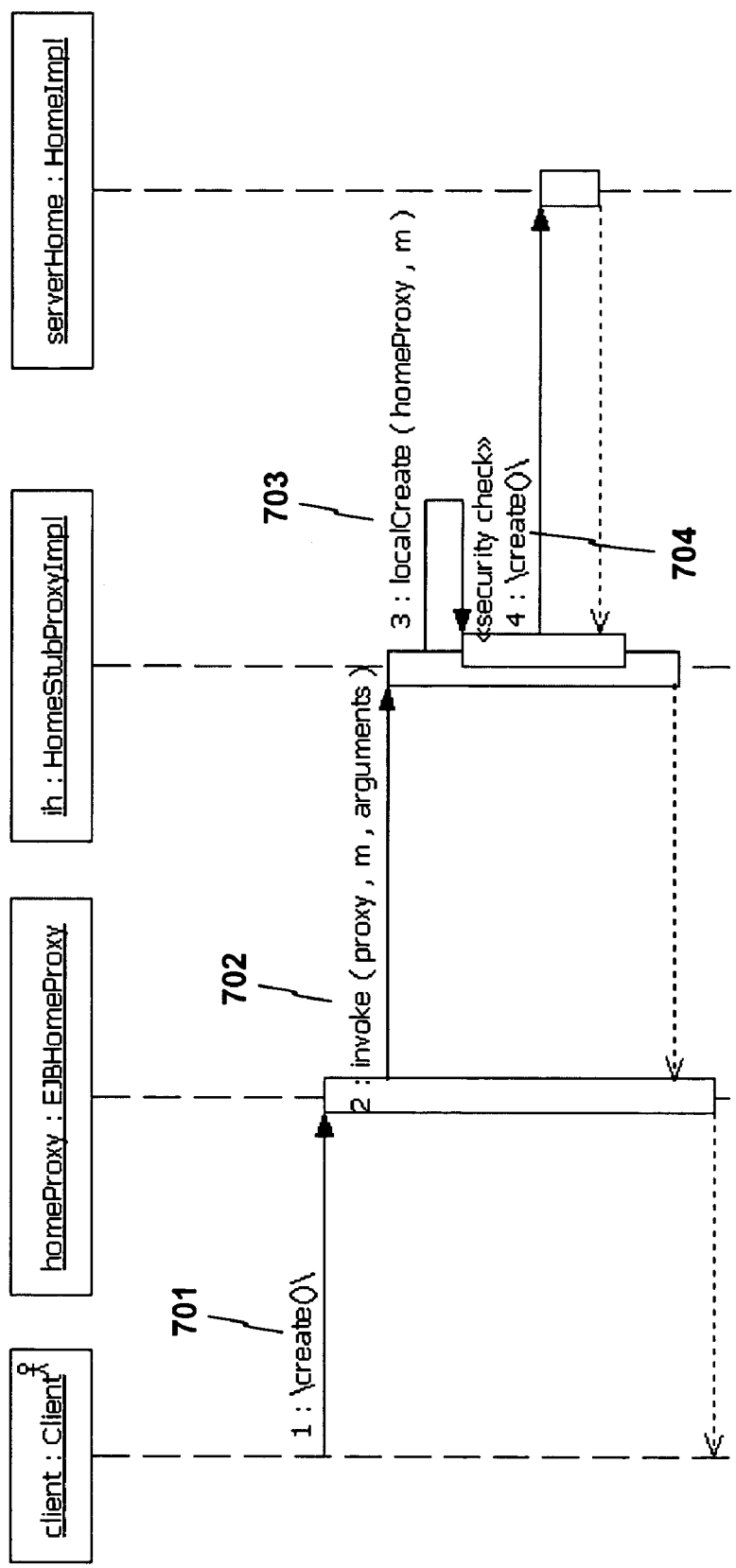
FIGS. 7-12 illustrate interaction diagrams which show how various objects interact with one another according to embodiments of the invention.

FIGS. 7-12 are interaction diagrams which show how various objects interact with one another according to embodiments of the invention. FIG. 7 illustrates one embodiment of how the home proxy processes method invocations on the home interface. Except methods from the EJBObject interface the home interface may expose only a single create method 701 with no parameters. When the create method 701 is called, the proxy calls the Invocation Handler.invoke method 702 on its invocation handler, which checks if this method was declared with "unchecked" security in the bean's deployment descriptor. If no security check is needed, then no call to the server EJBHome object is performed, instead an EJBObject proxy is created by the home proxy, (e.g., via localCreate( ) 703 and create( ) 704), and is returned. As such, an expensive network call is saved.

Figure 8:
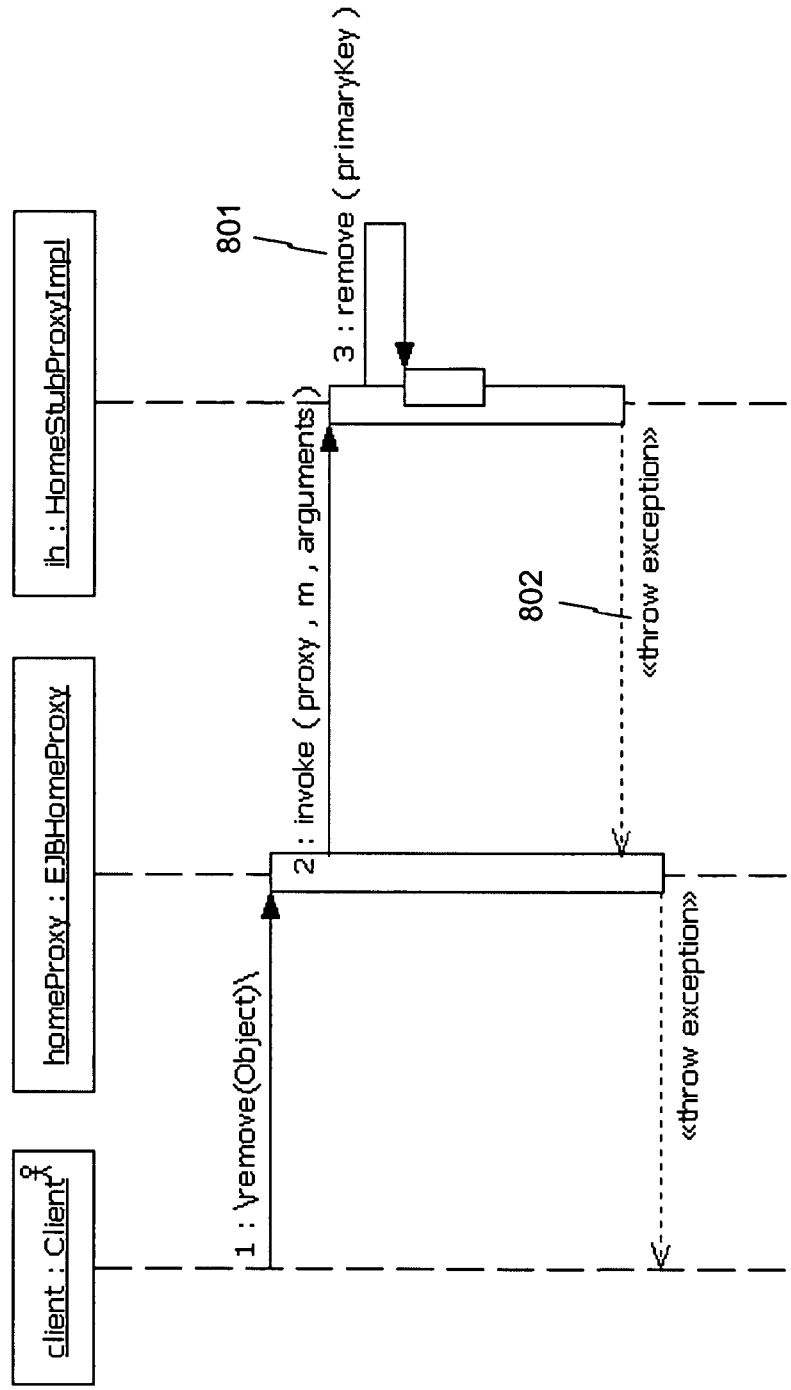

In one embodiment, other methods of the bean's home interface are handled slightly differently. The difference comes by the fact that, in this embodiment, the create method is not declared by the EJBHome interface, while all other methods from the stateless bean's home interface are. Referring now to FIG. 8, all methods defined by EJBHome interface share a common execution scenario, except for the remove(Object) method 801, which always throws RemoveException 802 as the stateless bean does not have primary keys.

Figure 9:
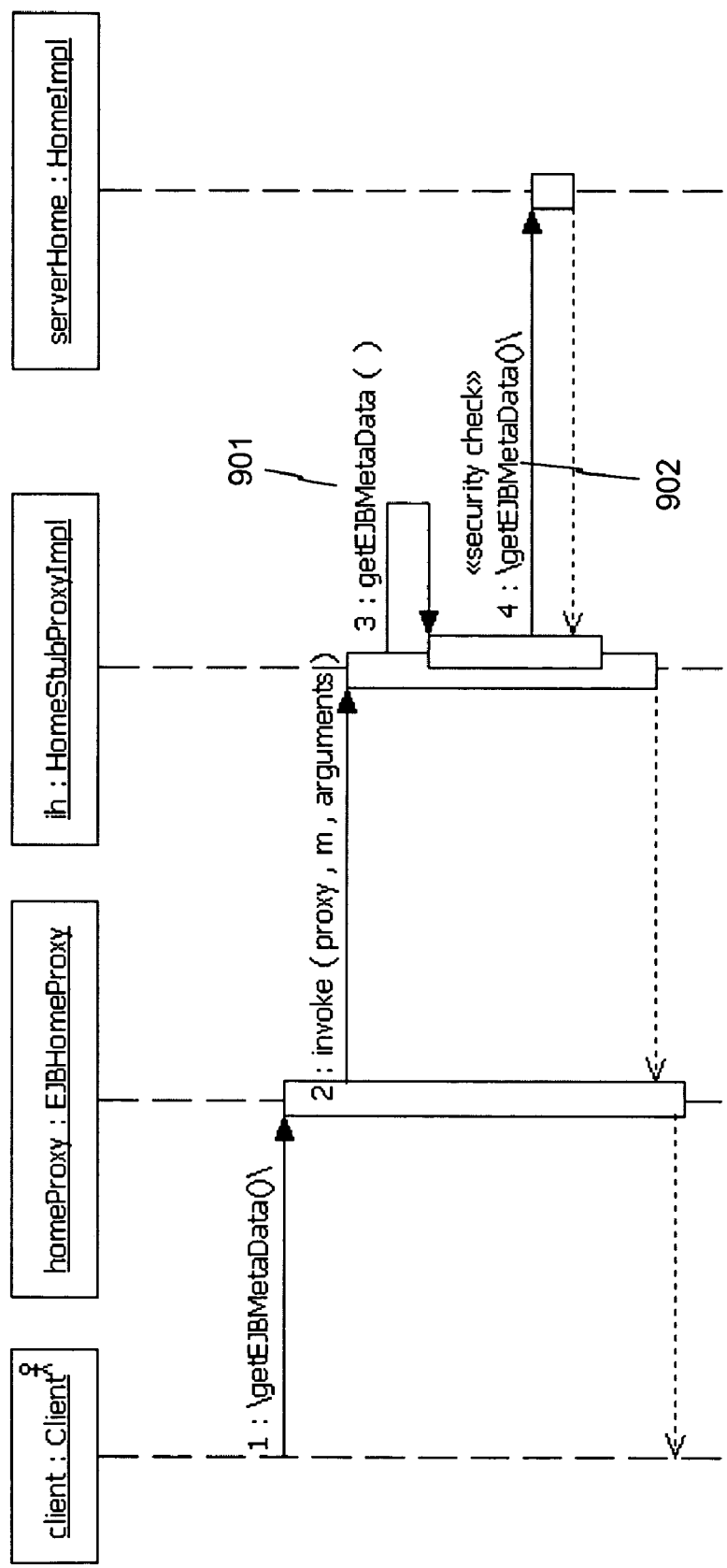

As indicated in FIG. 9, when a proxy receives a call to getEJBMetaData( ) method 901 it first determines whether this method requires a security check. If so, getEJBMetaData( ) is called on the server 902 in order to perform the security checks. A new EJBMetaData instance is created by the proxy and returned to the client. However, the getEJBMetaData( ) method was declared with "unchecked" security in the bean's deployment descriptor, then no call to the server EJBHome object is performed. Rather, the call is handled by the proxy and the results returned to the client.

Figure 10:
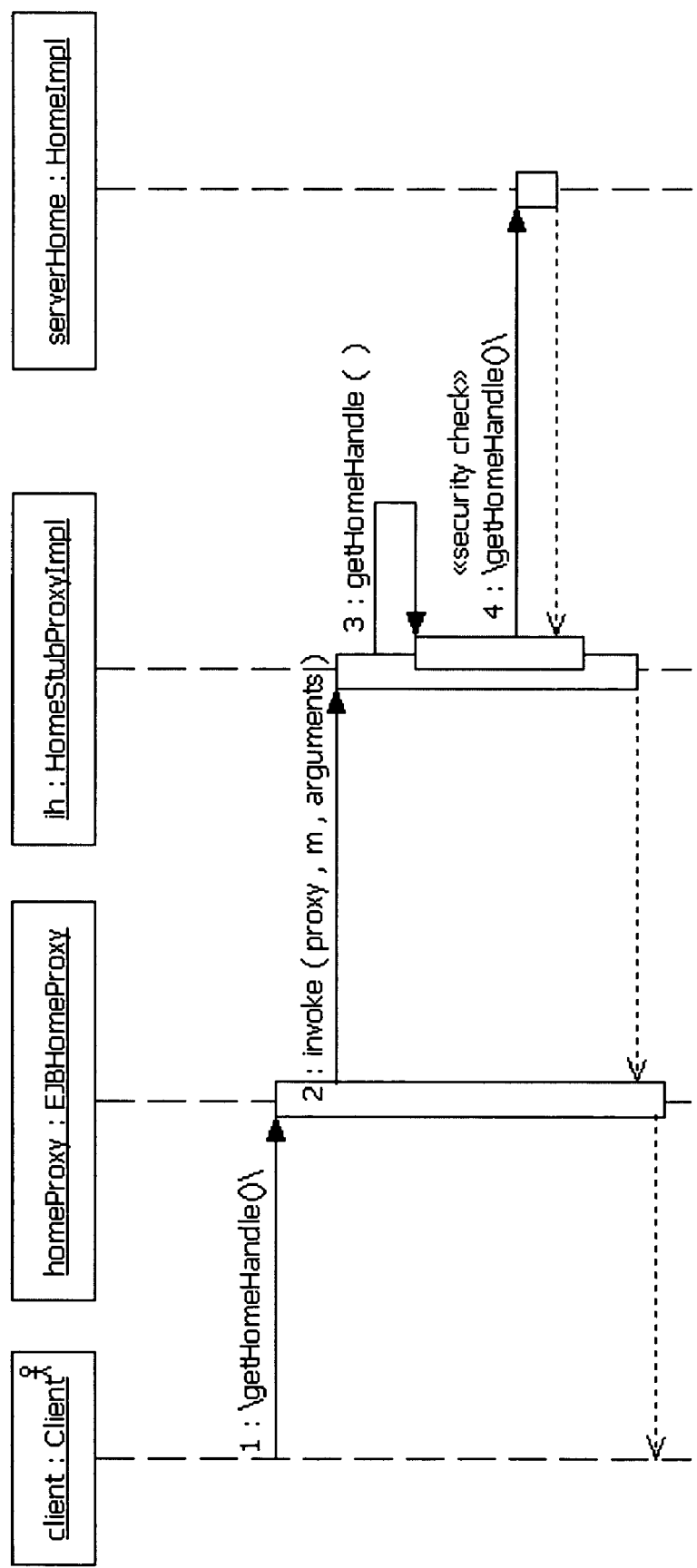
Figure 11:
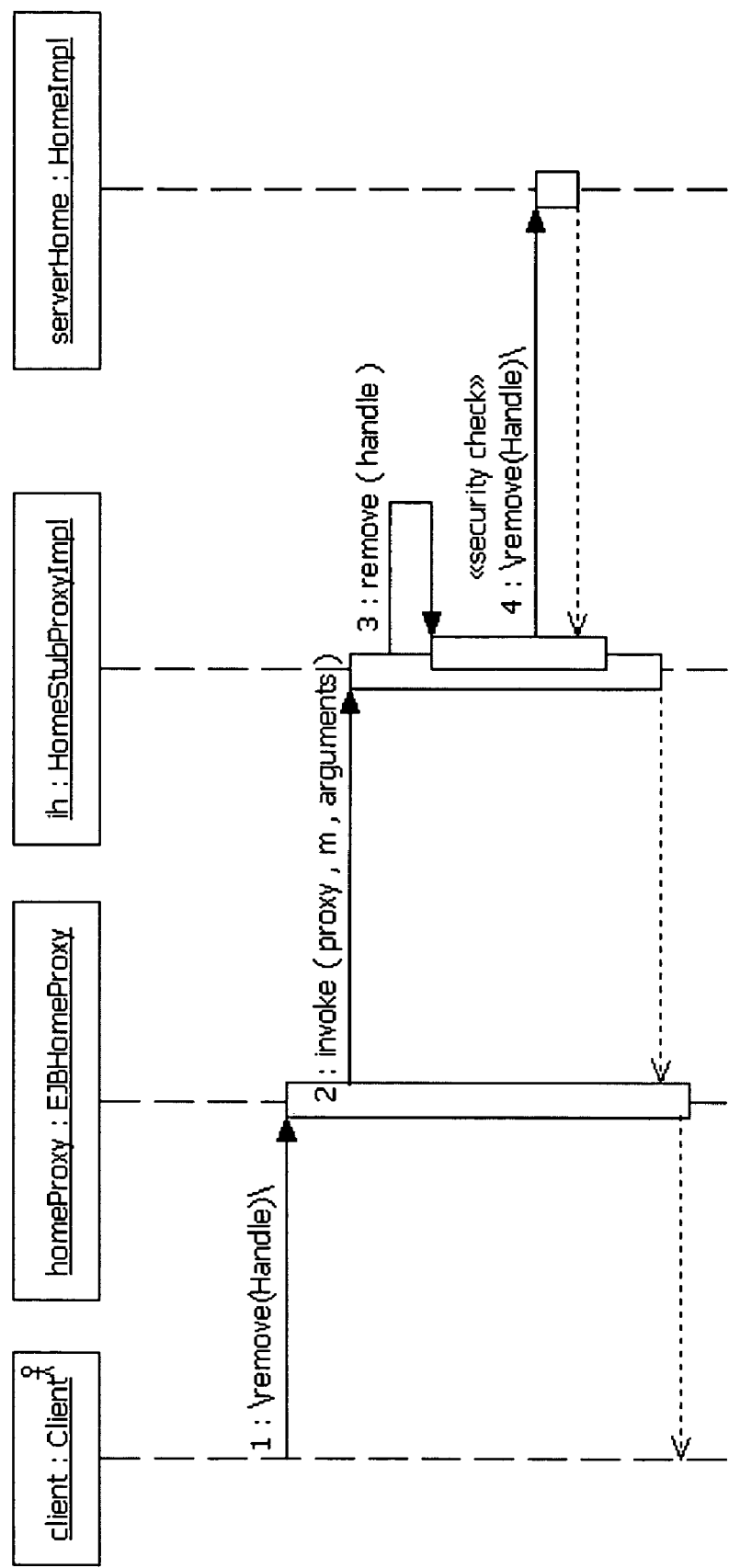

As illustrated in FIGS. 10 and 11, in one embodiment, the same general workflow occurs for getHomeHandle( ) and remove(Handle) methods, respectively.

In one embodiment, the same basic execution process is employed regardless of whether the proxy is in the same JVM or in a JVM other the one in which the server EJBHome object resides. In the latter case, the invocation handler does not invoke methods directly on server EJBHome object but on the remote stub.

In one embodiment, EJBObject proxies work in substantially the same way as described above for EJBHome proxies. If no security check is needed, methods of the EJBObject interface are again handled locally, while business methods are delegated directly to the server EJBObject regardless of the security settings.

Server Side Workflow

Figure 12:
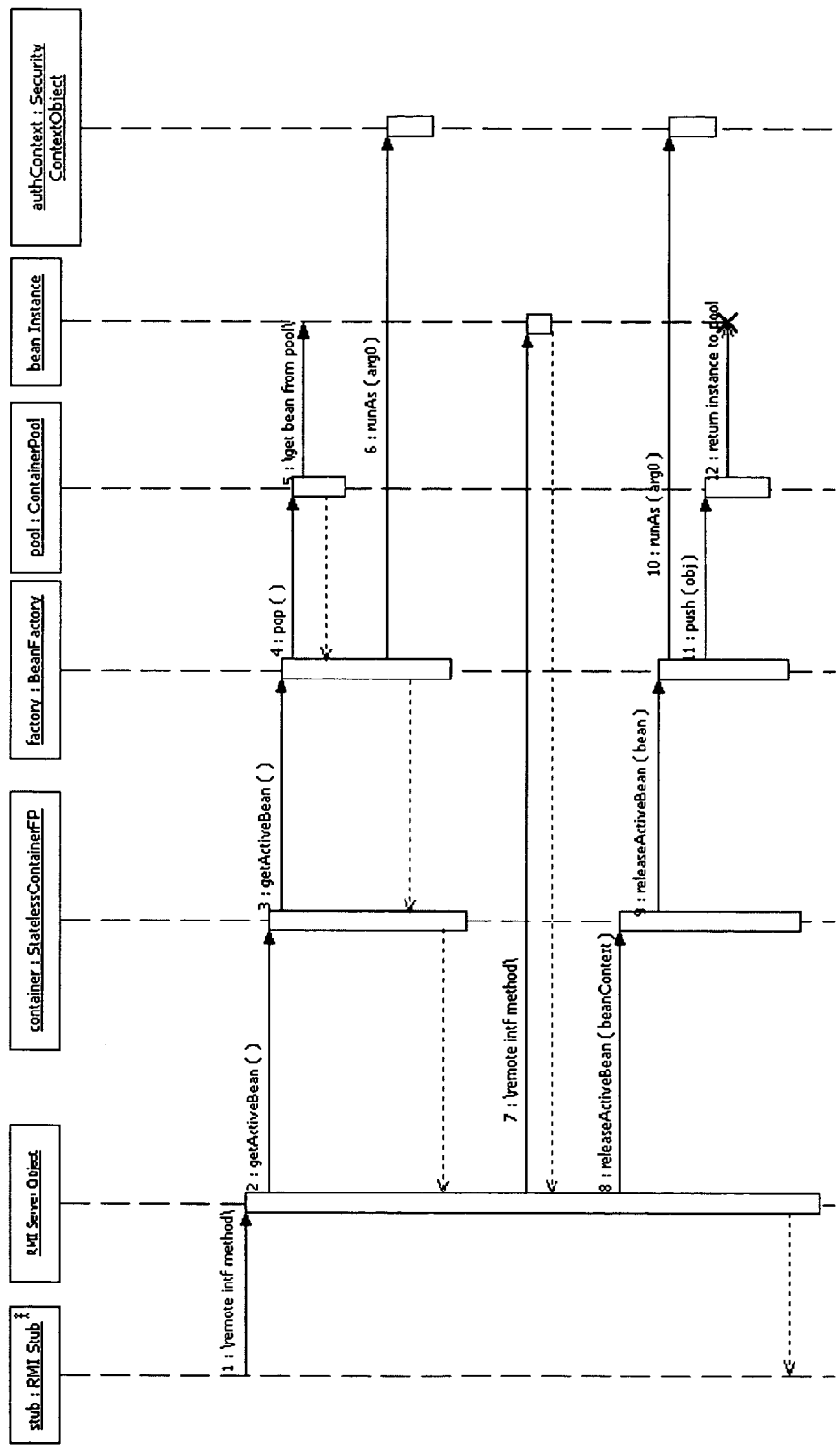

FIG. 12 provides an interaction diagram showing the server side workflow of one embodiment. It should be noted, however, that the particular server side workflow implementation shown in FIG. 12 is not required for complying with the underlying principles of the invention.

Upon receiving a call from remote client, the singleton server EJBObject processes it as shown in FIG. 12. First it retrieves a bean from the pool, and then if the run-as identity is configured, a security session for this call is created by using the SecurityContextObject.runAs method (see, e.g., Pool Management section above). At this point the fetched bean is ready for use and the server EJBObject begins executing the corresponding method. First, it performs any preliminary work such as security checks and transaction handling and then it calls the bean instance method. Finally, the bean is returned into the pool and the result conveyed back to the remote client.

Handles

Figure 13:
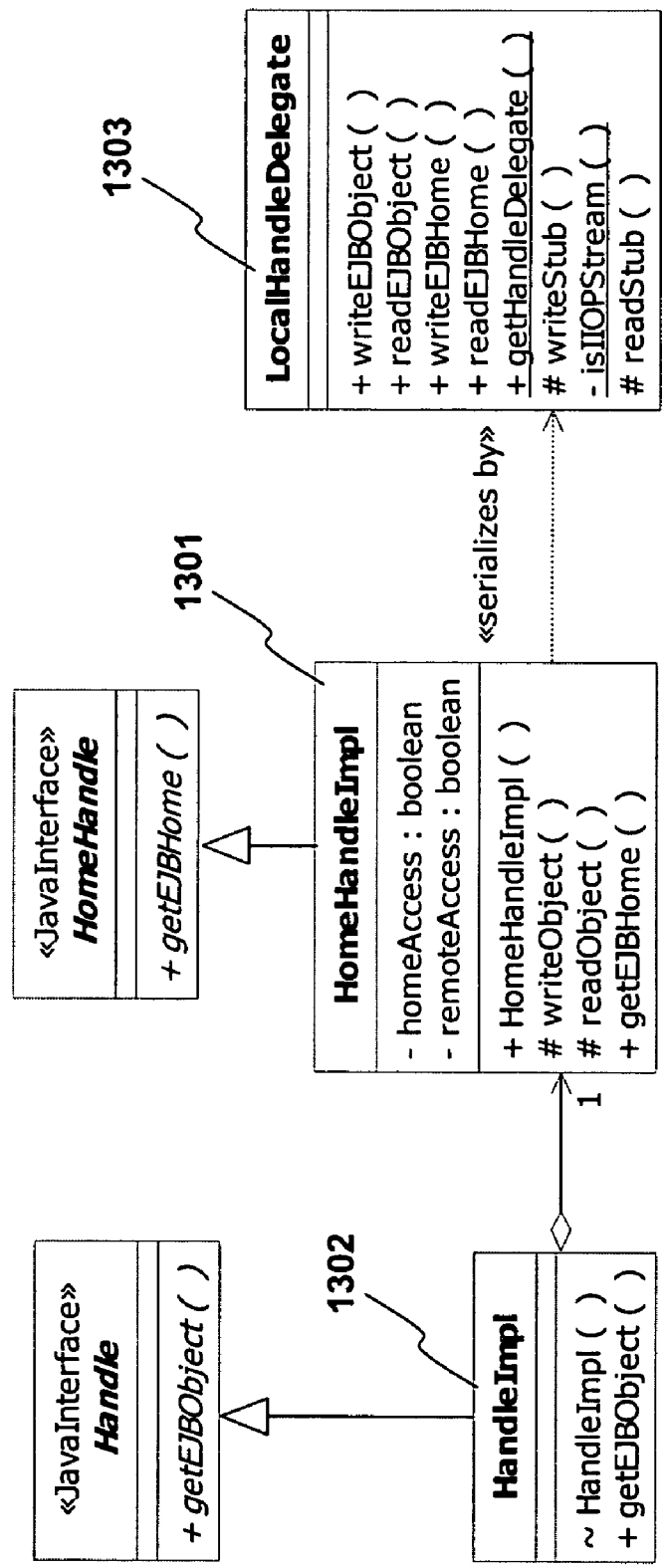
FIG. 13 illustrates a class diagram which describes a handle implementation used in one embodiment.

FIG. 13 illustrates a class diagram which describes the handle implementation used in one embodiment. The implementation of javax.ejb.HomeHandle and javax.ejb.Handle is given by HomeHandleImpl 1301 and HandleImpl 1302 classes. HandleImpl aggregates an instance of javax.ejb.HomeHandle that refers to the home that has created the EJBObject, which the handle points to. When the getEJBObject( ) method is invoked, the HandleImpl class recreates the home from the home handle and then uses its create method to obtain a reference to an EJBObject. HomeHandleImpl is in charge in serializing/deserializing RMI stubs and reconstructing home proxies. A custom serialization by the use of writeObject and ReadObject methods is implemented for this class. When an object is serialized it uses the writeObject to save both the stubs of the server EJBHome and the server EJBObject. Later on when the instance is deserialized it uses readObject( ) to read the RMI stubs, which in turn serve to recreate the home proxy. Class com.sap.engine.services.ejb.handles.LocalHandleDelegate 1303 is used to implement both readObject( ) and writeObject( ) this way handles can be serialized in any JVM.

In one embodiment, the smart proxy 400 described above is fully dynamic, constructed at runtime and does not require any code generation at deploy time. The end result is better memory usage, because a single object is exported in RMI; better performance as network calls are saved; less CPU load on the server because some of the methods are handled entirely within the client's JVM; and no need for application client jars as the proxies are generated dynamically.

Embodiments of the invention may include various steps as set forth above. The steps may be embodied in machine-executable instructions which cause a general-purpose or special-purpose machine, such as a computer processor or virtual machine, to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions.

Throughout the foregoing description, for the purposes of explanation, numerous specific details were set forth in order to provide a thorough understanding of the invention. It will be apparent, however, to one skilled in the art that the invention may be practiced without some of these specific details. For example, while the embodiments of the invention described above focus on the Java environment, the underlying principles of the invention may be employed in virtually any environment in which relational database data is mapped to an object-oriented representation of the relational database data. These environments include, but are not limited to J2EE, the Microsoft.NET framework, and the Advanced Business Application Programming ("ABAP") standard developed by SAP AG.

Moreover, although the embodiments of the invention described above employ specific interactions as illustrated in FIGS. 7-12, some of these specific interactions are not required for complying with complying with the underlying principles of the invention.

Accordingly, the scope and spirit of the invention should be judged in terms of the claims which follow.

What is claimed is:

1. A system comprising at least one memory for storing program code and a processor for processing the program code to responsively generate:
   a business object interface to generate business object instances in response to a client request from a client, wherein the business object instances perform operations on a set of application data in response to the client request; and
   a proxy object to analyze client requests from the client directed to the business object interface and to responsively determine whether the client requests are serviced locally by the proxy object or whether the client requests are serviced by the business object interface, the client to hold a direct reference to the proxy object, and wherein the analyzing of the client requests by the proxy object includes analyzing the client request on behalf of one or more of a home object and a remote object to eliminate a necessity for the client to hold a direct reference to one or more of the home object and the remote object,
   wherein if the client requests are not serviced locally by the proxy object, then transmitting information related to the client requests to the business object interface, and wherein if the client requests are serviced locally by the proxy object, then servicing the requests locally, without transmitting information related to the client requests to the business object interface.

2. The system as in claim 1 wherein the business objects comprise enterprise rise Java beans ("EJBs") managed by an EJB container.

3. The system as in claim 1 wherein the business object interface comprises one or more of a home interface corresponding to the home object, and a remote interface corresponding to the remote object implemented within an EJB container.

4. The system as in claim 1 wherein the analysis by the proxy object comprises determining whether security checks are performed on the client request, wherein the proxy object services the client request if no security checks are required.

5. The system as in claim 4 further comprising:
   a deployment descriptor having stored therein an indication that no security checks on the client are required, wherein the proxy object determines whether security checks are required by checking a security indication in the deployment descriptor.

6. The system as in claim 5 further comprising an invocation handler which, responsive to the proxy object, checks the indication in the deployment descriptor.

7. The system as in claim 1 wherein the client requests comprise remote method invocations ("RMI") generated by the client.

8. The system as in claim 7 wherein the remote method invocation comprises a create( ) method to create an instance of one of the business objects.

9. The system as in claim 7 wherein the remote method invocation comprises a remove( ) method to remove an instance of one of the business objects.

10. The system as in claim 1 wherein the proxy object comprises an instance of a dynamic proxy class, the method further comprising:
    dynamically generating the proxy object from the dynamic proxy class.

11. A computer-implemented method comprising:
    analyzing a client request from a client directed to a business object interface, the business object interface generating one or more business object instances which perform operations on a set of application data in response to the client request; and
    determining whether client requests, from the client, are serviced locally by a proxy object or whether the client requests are serviced by the business object interface based on the analysis of the client request, the client to hold a direct reference to the proxy object, and wherein the analyzing of the client requests by the proxy object includes analyzing the client request on behalf of one or more of a home object and a remote object to eliminate a necessity for the client to hold a direct reference to one or more of the home object and the remote object,
    wherein if the client requests are not serviced locally by the proxy object, then transmitting information related to the client requests to the business object interface, and wherein if the client requests are serviced locally by the proxy object, then servicing the requests locally, without transmitting information related to the client requests to the business object interface.

12. The method as in claim 11 wherein the business objects comprise enterprise Java beans ("EJBs") managed by an EJB container.

13. The method as in claim 11 wherein the business object interface comprises one or more of a home interface corresponding to the home object, a remote interface corresponding to the remote object implemented within an EJB container.

14. The method as in claim 11 wherein the analysis comprises determining whether security checks are performed on the client request by a business object, wherein the client request is serviced locally by the proxy object if no security checks are required.

15. The method as in claim 14 further comprising:
    determining whether security checks are required by checking a security indication in the deployment descriptor.

16. A machine-readable storage medium having stored thereon program code which, when executed, cause a machine to:
    analyze a client request from a client directed to a business object interface, the business object interface generating one or more business object instances which perform operations on a set of application data in response to the client request; and
    determine whether client requests, from the client, are serviced locally by a proxy object or whether the client requests are serviced by the business object interface based on the analysis of the client request, the client to hold a direct reference to the proxy object, and wherein the analyzing of the client requests by the proxy object includes analyzing the client request on behalf of one or more of a home object and a remote object to eliminate a necessity for the client to hold a direct reference to one or more of the home object and the remote object, wherein if the client requests are not serviced locally by the proxy object, then transmitting information related to the client requests to the business object interface, and wherein if the client requests are serviced locally by the proxy object, then servicing the requests locally, without transmitting information related to the client requests to the business object interface.

17. The machine-readable storage medium as in claim 16 wherein the business objects comprise enterprise Java beans ("EJBs") managed by an EJB container.

18. The machine-readable storage medium as in claim 16 wherein the business object interface comprises one or more of a home interface corresponding to the home object, and a remote interface corresponding to the remote object implemented within an EJB container.

19. The machine-readable storage medium as in claim 16 wherein the analysis comprises determining whether security checks are performed on the client request by a business object, wherein the client request is serviced locally by the proxy object if no security checks are required.

20. The machine-readable storage medium as in claim 19 comprising additional program code to cause said machine to:

determine whether security checks are required by checking a security indication in the deployment descriptor.

\* \* \* \* \*